US006264259B1

(12) United States Patent
Fortune

(10) Patent No.: US 6,264,259 B1
(45) Date of Patent: Jul. 24, 2001

(54) HAND HELD MULTICYCLE VACUUM PUMP PICKUP TOOL

(76) Inventor: William S. Fortune, 29866 Cuthbert Rd., Malibu, CA (US) 90265

( * ) Notice: Subject to any disclaimer, the term of this patent is extended or adjusted under 35 U.S.C. 154(b) by 0 days.

(21) Appl. No.: 09/483,836

(22) Filed: Jan. 17, 2000

(51) Int. Cl.[7] ...................... B25J 15/06

(52) U.S. Cl. ...................... 294/64.1

(58) Field of Search ...................... 294/1.2, 64.1, 294/64.2; 29/743, 758; 269/21; 433/95

(56) References Cited

U.S. PATENT DOCUMENTS

| | | | | |
|---|---|---|---|---|
| 2,711,586 | * | 6/1955 | Groves | 294/64.1 X |
| 4,767,142 | * | 8/1988 | Takahashi et al. | 294/64.1 |
| 5,106,139 | * | 4/1992 | Palmer et al. | 294/64.1 |
| 5,169,192 | * | 12/1992 | Allison et al. | 294/64.1 |
| 5,799,994 | * | 9/1998 | Tsai et al. | 294/64.1 |
| 5,833,288 | * | 11/1998 | Itasaka | 294/64.1 |
| 5,928,537 | * | 7/1999 | Fortune | 294/64.1 X |

* cited by examiner

*Primary Examiner*—Johnny D. Cherry
(74) *Attorney, Agent, or Firm*—Daniel T. Anderson

(57) ABSTRACT

A compact hand held suction cup type pickup tool is disclosed having a self contained, finger actuated vacuum pump that can be repeatedly cycled to maintain a very strong holding action for an indefinite period of time. The multi-cycling is achieved by automatic, unidirectional valving associated with the pump.

1 Claim, 7 Drawing Sheets

FIG. 12
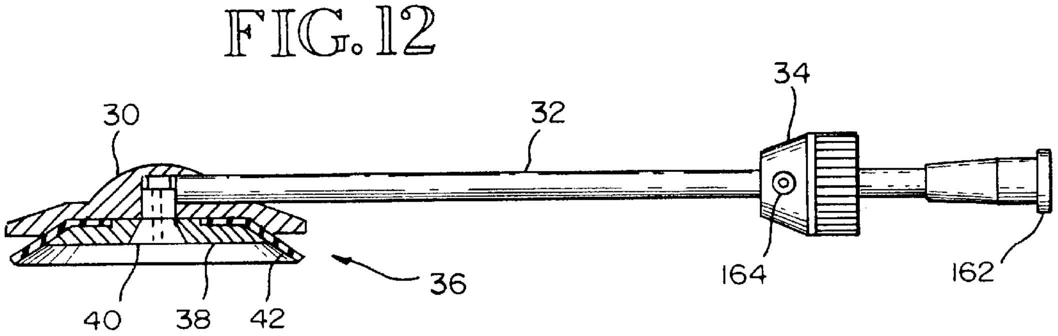
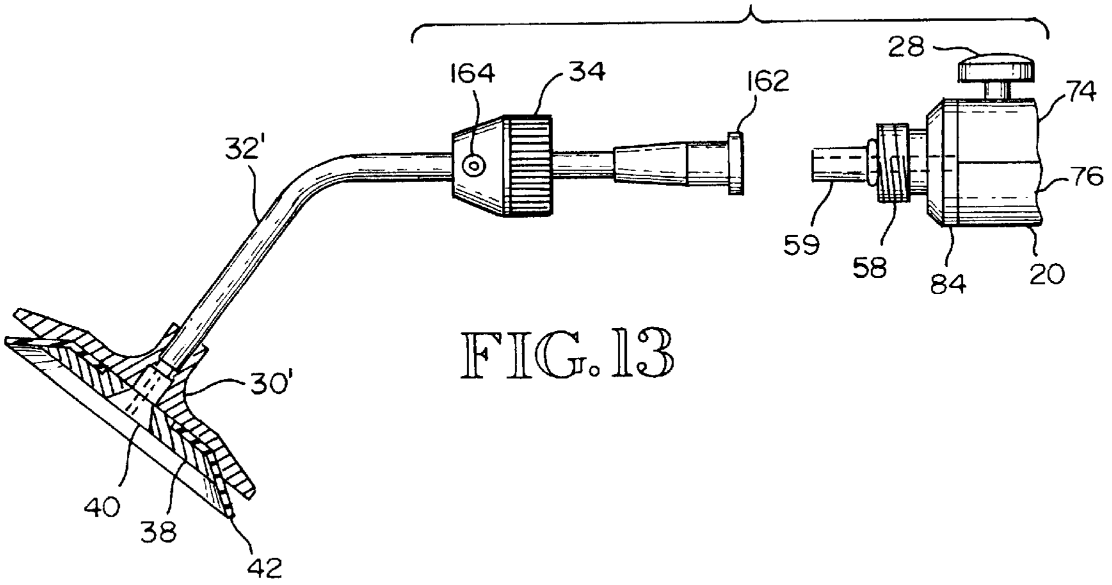
FIG. 13
FIG. 14
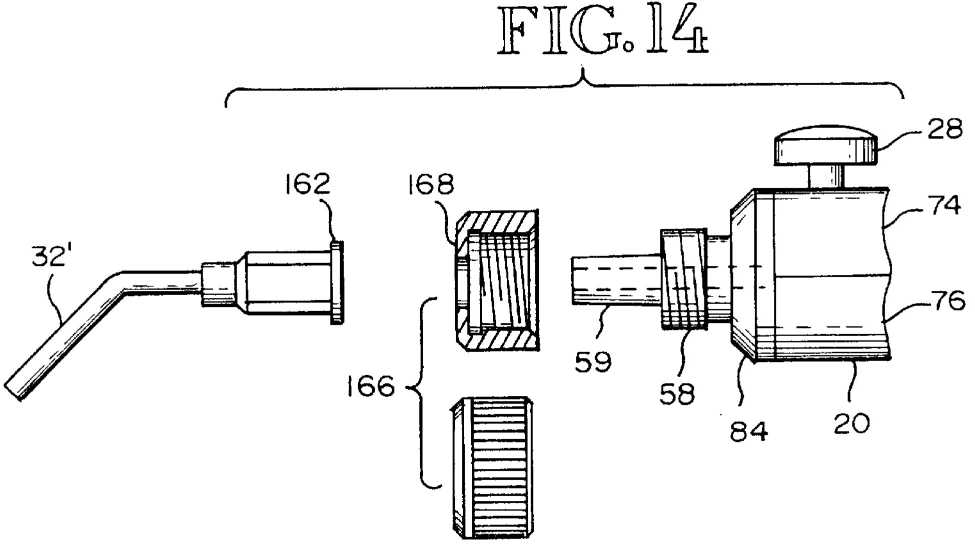

HAND HELD MULTICYCLE VACUUM PUMP PICKUP TOOL

BACKGROUND OF THE INVENTION

This invention relates generally to a tool for handling small parts and more particularly to improvements in hand held, pneumatically operated implements for picking up, placing, adjusting, or removing delicate or sensitive parts such as an electronic microelement to be affixed and connected to a circuit board or a larger integrated circuit chip to be affixed and connected with its many solder points to a circuit board.

In the development of modem microelectronics, the various elements and components incorporated into the assembly of a circuit as, for example, in a microprocessor, a computer, or controls for automated apparatus, have typically become smaller, more delicate and sensitive, more costly, and very critical in their exact placement, as on a circuit board, during assembly or manufacture or testing or repair or replacement. Consequently, it has become increasingly difficult, for example, to successfully and efficiently select a small part, pick it up, place it precisely, hold it during a soldering or other securing process, and then release it—all without placement or orientation error and without subjecting the part to unacceptable mechanical, thermal, or electrical stresses.

Prior art efforts have typically been directed toward mechanical holding techniques such as clamps, forceps, tweezers, or the like; and in some applications such approaches are satisfactory. However, holding a small part by mechanical measures have disadvantages of lack of reliability or of the part slipping away and being dropped. Further the mechanical stress caused by the tweezer compression can, for delicate parts, be intolerable. Further, such tools suffer a lack of versatility in exactly how and in what orientation it selects and picks up the part.

One non-mechanical approach has been to provide a hand held tool containing a spring loaded piston creating a vacuum chamber between the interior of the tool and a suction cup affixed to the nozzle end of the tool. When a part is to be picked up, the piston is pushed forwardly by a plunger or trigger toward the nozzle, the part is placed against the suction cup, and the piston released to create a holding vacuum by the spring. When the part is to be released, the plunger or trigger is again pushed forwardly to extinguish the vacuum within the chamber and the holding suction cup. Another version of this technique is to provide instead of a spring loaded piston within the chamber, a fountain pen type elongated bladder which is compressed by a trigger holding a vane against the side of the bladder to create a vacuum. Again, when the part is to be released, the vane against the bladder is pushed inwardly by the trigger and the holding vacuum is extinguished.

These prior art vacuum devices suffer from at least three limitations which for many modem applications constitute serious disadvantages: first, there is a limit to the magnitude or volume of the vacuum available due to the geometry of the piston chamber or bladder; second, some leakage is inherent and thus the holding time for such a device is limited such that its holding force is not constant, diminishes, and at an unknown moment the part may be released and dropped; third, the necessity of "working" the piston to extinguish the holding vacuum may cause an unacceptable recoil or other displacement of the part just as it is being critically emplaced. This type of holding device is well described in U.S. Pat. No. 5,106,139, issued to H. D. Palmer on Apr. 21, 1992 and entitled HAND-HELD PICK-UP DEVICE.

The prior art also includes hand held implements which utilize an external source of compressed air to generate holding forces as by "suction cup" or venturi effects. For a description and discussion of this class of holding devices and their development see Applicant's U.S. Pat. No. 5,928,537 issued Jul. 27, 1999, entitled PNEUMATIC PICKUP TOOL FOR SMALL PARTS and its pending divisional application Ser. No. 09/359,451 filed Jul. 22, 1999, now U.S. Pat. No. 6,043,458, entitled "PNEUMATIC ROTATABLE HAND HELD PICKUP TOOL".

It is an object of the present invention to provide a pickup or holding implement which is not subject to the above and other disadvantages and limitations of the prior art.

It is another object to provide such a tool which while being very light and compact can create and maintain a vacuum generated high magnitude holding force for an unlimited time and yet be released instantly and without displacement when desired.

It is another object to provide such a tool which in operation does not suffer recoil or other deleterious reaction effects.

It is another object to provide such a tool which may supplement or boost the holding effects of a fixed vacuum shop line.

It is another object to provide such a tool which may create and maintain a "reservoir" of vacuum for providing holding effects instantly on demand.

It is another object to provide such a tool which is rugged, reliable, simple to operate and maintain, and which is inexpensive to manufacture.

It is another object to provide such a tool which is versatile with respect to the proper and effective handling of very small, very large and heavy, pressure or distortion sensitive, or high temperature parts.

SUMMARY OF THE INVENTION

Briefly, these and other objects are achieved in a presently preferred example of the invention in which a small, tubular body is provided having a chamber defined at one wall by a flexible diaphragm attached to an external arm for controlling its effective volume. The chamber has a one way air valve connected to the ambient atmosphere and a one way valve connected to a vacuum nozzle such that working the arm to flex the diaphragm forces air to flow into the nozzle, through the chamber, and into the ambient atmosphere. A Suction cup-like fixture affixed to the end of the nozzle may be applied in obvious fashion to a workpiece part so that when the chamber diaphragm is pumped, a vacuum holding force is created at the suction cup by the vacuum between it and the chamber. A simple gage may be provided to indicate the presence of an effective magnitude of vacuum.

In operation, the arm attached to the diaphragm may be periodically actuated to maintain, indefinitely, the desired selected holding force at the nozzle end of the tool. When release of the workpiece part is desired, a trigger button release valve interposed between the chamber and the nozzle is actuated to open the nozzle, and thereby the suction cup, directly to the atmosphere.

An additional vacuum reservoir plenum may be provided between the chamber and the trigger release valve to provide additional holding effect by integrating more pumping strokes of the chamber diaphragm. Further, in another example, the trigger release valve may be of the character to be normally closed whereby the chamber (and the plenum) may be fully evacuated even though the suction cup is not engaged to a workpiece. Thus the tool is fully "charged" and ready for use without pumping of the diaphragm. In this configuration and mode, the suction cup of the fully charged tool is placed upon the workpiece and then the trigger is actuated to connect the suction cup to the chamber to create the desired holding effect. For release of the workpiece part, the trigger is released or moved to another position to connect the nozzle to the atmosphere.

DESCRIPTIVE LISTING OF THE FIGURES

FIGS. 12, 13 and 14 are detailed views of the nozzle and suction cup portions of the structure of 13, 14 FIG. 1;

DETAILED DESCRIPTION OF PREFERRED EMBODIMENT

Figures 1, 2, 3:
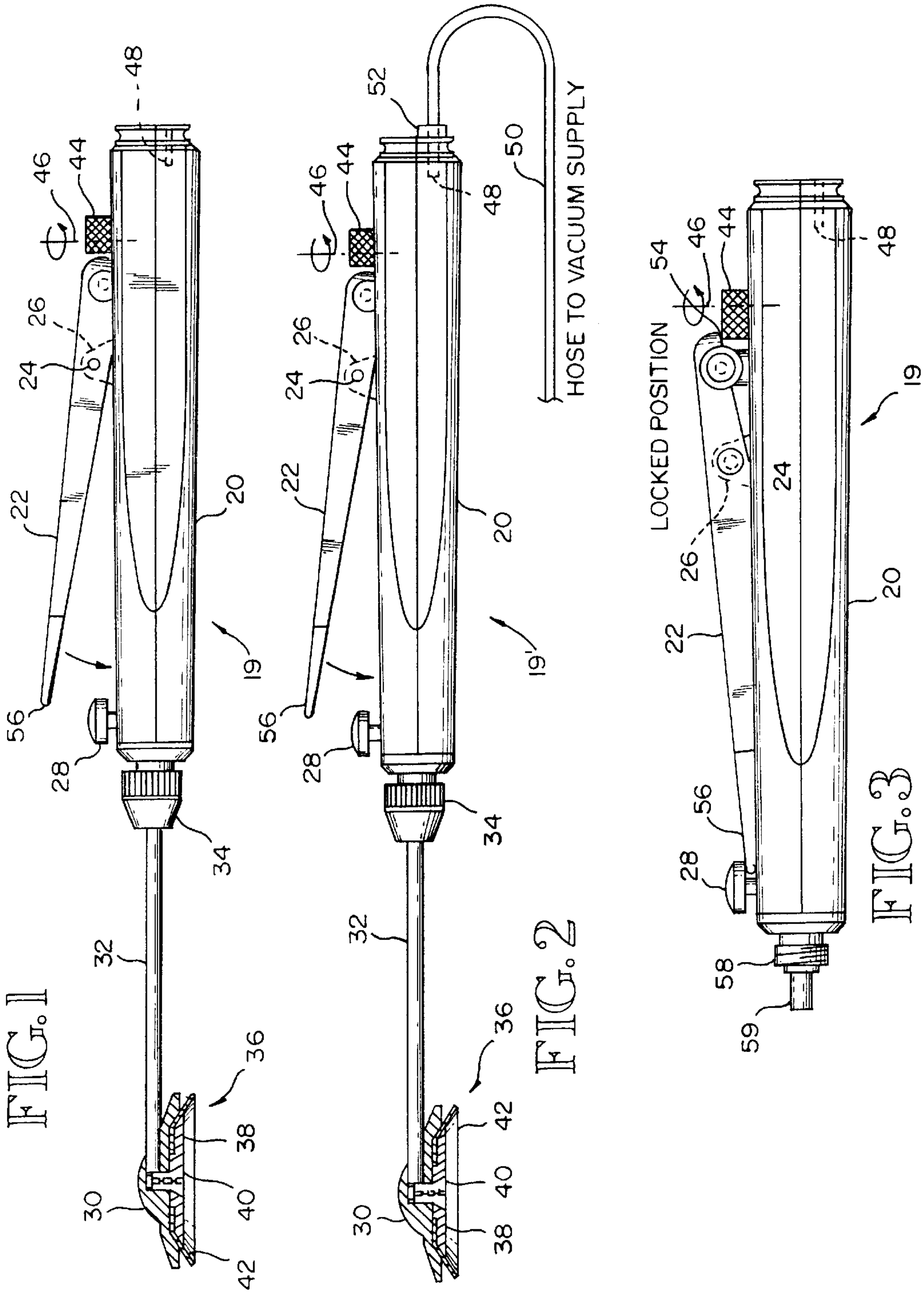
FIG. 1 is an elevational view of an example of a hand held multicycle vacuum pump pickup tool embodying features of the present invention.
FIG. 2 is an elevational view illustrating a modified example of the tool of FIG. 1.
FIG. 3 is an elevational view of a portion of the structure of FIG. 1 in a different configuration.

In FIG. 1, the example of the invention illustrated includes a pickup tool 19 having a housing body 20 and a handle lever 22 pivoted about a pin 24 through a post 26 mounted on the body 20. A finger actuated trigger button 28 is disposed near the forward ends of the body 20 and lever 22. A circular suction cup holder 30 is rigidly affixed to the forward end of a hollow wand member 32 which in turn is removeably attached to body 20 by a retaining nut 34. The remainder of a suction cup assembly 36 comprises a retaining disc 38 which is centrally attached to the holder 30 by a machine screw 40 which is bored along its axis to permit air flow from within the suction cup to the interior of the wand member 32. A circular, thin disc 42 of elastomeric material, such as virile or silicon rubber, having a diameter greater than that of the disc 38 is compressed and thereby concentrically retained between the disc 38 and the holder 30 to form the suction cup per se.

Disposed toward the rear of the body 20 is an eccentric locking knob 44 contiguous to the rear, back end of the lever 22 and rotatable about its vertical mounting pin 46 to selectively engage and lock the lever 22 in its down position.

An exhaust orifice 48 is formed through the rear surface of the body 20 to provide an outlet for air drawn into the device at the suction cup 36.

In FIG. 2 the example of a vacuum pump pickup tool 19' may be considered to be in all significant respects identical to the pickup tool 19 of FIG. 1 except that the tool 19' is in a vacuum booster configuration and is coupled to a vacuum line 50 through a fitting 52 attached to the exhaust orifice 48 of the body 20 of the pickup tool 19' as shown.

Referring to FIG. 3, the body portion of the pickup tool 19 of FIG. 1 is shown with the locking knob 44 rotated 180° to engage the base end 54 of the lever 22 and thereby hold its forward end 56 down against the body 20. It should be noted as will be clear infra, that the forward end 56 does not interfere with the trigger button 28, as this view might imply, because the end 56 is unshaped to partially surround the button 28 for ease of operation by the finger tip of the operator.

In this view without the suction cup 36 and wand 32 attached, the tapered and threaded nozzle end fitting 58 of the body 22 is shown. As described below, the fitting 58 is terminated in a tapered nib 59.

Figure 4:
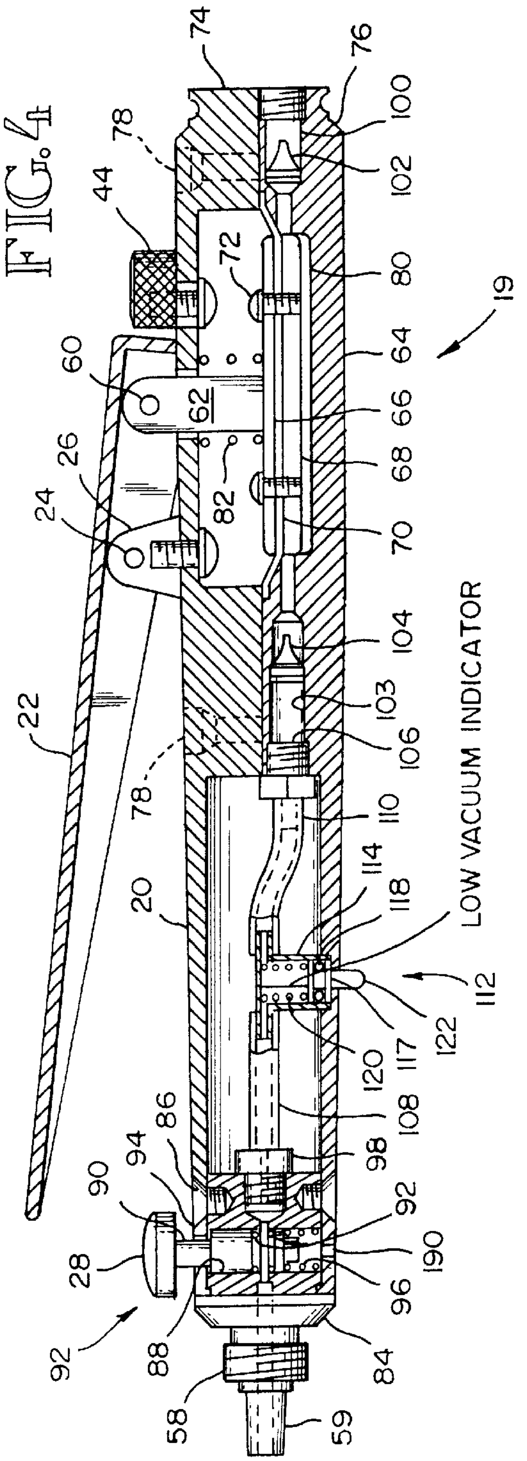
FIG. 4 is a longitudinal sectional view of a different example of the invention.
Figure 5:
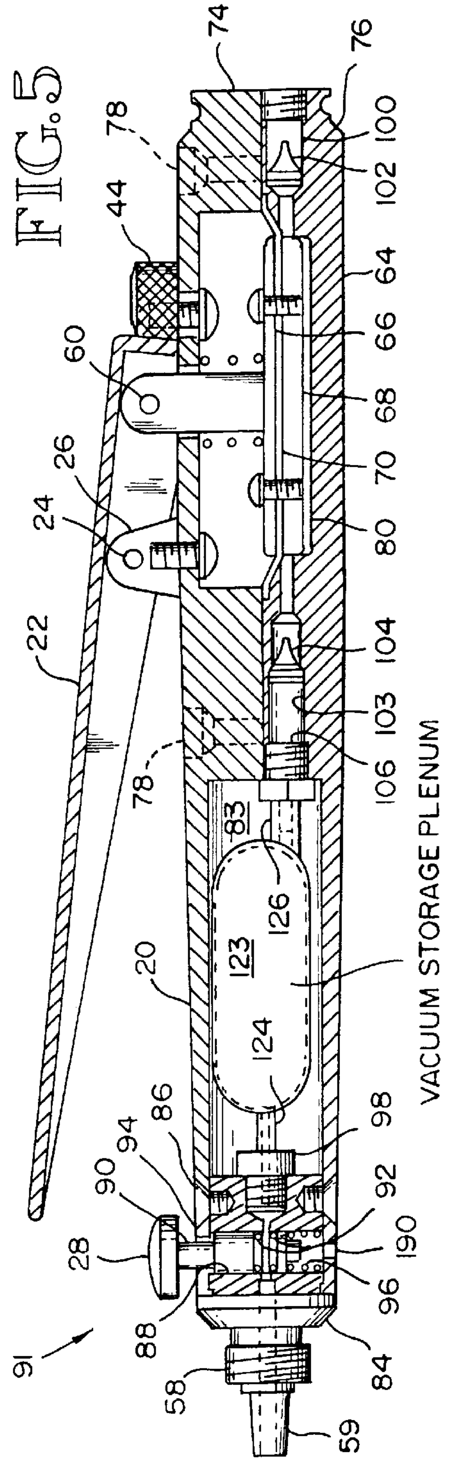
FIG. 5 is a longitudinal sectional view of an alternative example of the invention.

In FIGS. 4 and 5 alternative interior structural details of the pickup tool 19 of FIG. 1 are shown; however, the basic structure is identical for these examples. Accordingly, for clarity of description, like parts and components are given the same reference numerals in all three figures; and different reference numerals are used to identify portions that are structurally distinct. Therefore, reference can be made, as desired, to FIG. 1 for explicit identification of the external parts common to the three figures.

Affixed near the rear of the lever 22 is a pin 60 attached to the top of a rod 62 which is in turn connected to a diaphragm assembly 64 which comprises a pair of sandwiching plates 66, 68 and an elastomeric diaphragm sheet 70 of virile or silicon rubber, compressed therebetween by a set of clamping screws 72. The body 20 of the tool 19 is formed basically by two halves 74, 76 juxtaposed along a horizontal mid plane and secured together by a set of screws 78.

The two halves 74, 76 are each formed with a mating portion of a vacuum chamber 80 relieved therefrom, the periphery of which, between the two halves along their mid plane, compressively retains the periphery of the diaphragm sheet 70 so that when the lever 22 is pressed downwardly, the diaphragm assembly 64 is drawn upwardly by the rod 62 and a vacuum is created below the diaphragm in the chamber 80. A compression spring 82 is disposed about the rod 62 and acts, along with restoring forces of the elastomeric diaphragm 70, to return the diaphragm assembly to its downward position and the lever 22 to its upward position.

The forward portions of each of the body halves 74, 76 are together cylindrically hollowed out, to cooperatively form a cylindrical cavity 83, and each is secured to a cylindrical valve bushing 84 by a set of screws 86. The valve bushing 84 is formed with a transverse valve cylinder bore 88 within which is disposed a valve body 90 carrying at its top, external end the trigger button 28. The resultant valve 91, in this example, is of the normally open character and the valve body is a loose, leaking piston except between a pair of retained O-rings 92. The valve body 90 is retained in the bore 88 by a lip 94 on the upper body half 74 and is returned upwardly by a compression spring 96 disposed in the bore below the valve body.

The valve bushing 84 is also axially centrally bored to permit air flow through its forward end which forms the fitting 58 and through its rearward end which is threaded to receive a fitting 98.

Thusly as shown, the valve 91 is open and air flow is permitted between the fittings 58 and 98 through the space between the o-rings 92. When, however, the trigger button is pressed downwardly against the spring 96, the longitudinal path between the fittings 58, 98 is opened to the atmosphere through an opening 190 in the base of the cylinder bore 88; and by the loose fitting valve body 90; and any holding effect at the suction cup is released.

The lower half 76 of the body 20 is provided with an axial bore 100 extending from its rear end to the vacuum chamber 80 which serves to threadingly receive the fitting 52, when used, and to retain a one-way, duck-bill valve 102 which permits air flow rearwardly. The lower half 76 is also provided with a bore 103 extending forwardly from the vacuum chamber 80 to the cylindrical cavity 83 and is formed to retain a second one-way duck-bill valve 104, which also permits air flow only rearwardly, and a fitting 106. When it is desired to have a delicate blowing instrument for dusting or otherwise cleaning a sensitive part, a cleaning air flow jet (the exhaust from the chamber 80) may be provided at the output of the fitting 52.

Referring specifically to FIG. 4, the fittings 98 and 106 may, in a basic form of the invention, be simply connected together through a unitary tubing member, not shown, to provide an air-tight one-way air path from the input of the fitting 58 to the output of the duck-bill valve 104. In this example, however, such a unitary tubing member is replaced, as shown, by a forward tube 108 and a rearward tube 110 which are joined by a pressure indicator 112. The indicator 112 may consist of a fitting 114 affixed to the wall of the lower half 76 of the body 20 at the cavity 83. The fitting 114 includes a cylinder bore 116 and a floating valve body 117 therein sealed to the cylinder wall by an o-ring 118 and urged outwardly by a compression spring 120 such that a vacuum in the tubes 108, 110 draws the valve body 117 upwardly against the force of the spring as a measure of the magnitude of vacuum. A colored indicator head portion 122 of the valve body extends through the wall of the body 20 to indicate a low magnitude of vacuum and disappears internally when the vacuum is high.

Referring specifically to FIG. 5, a vacuum plenum for storage of a higher volume of vacuum is provided by a rigid tank 123 connected to the fittings 98 and 106 by tubes 124, 126 respectively.

Figure 6:
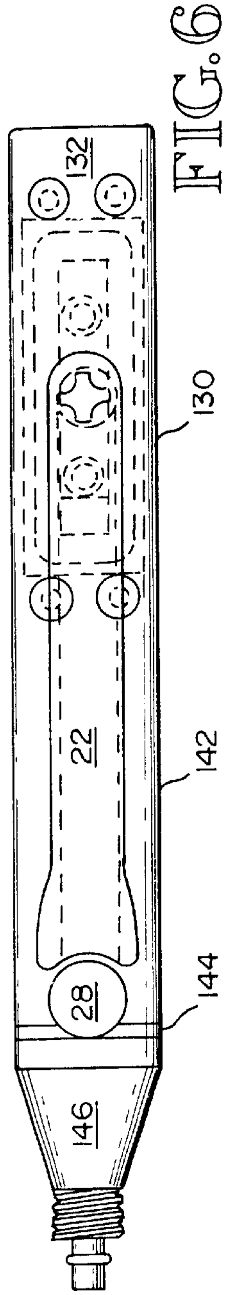
FIG. 6 is a plan view of an example of the invention.
Figure 7:
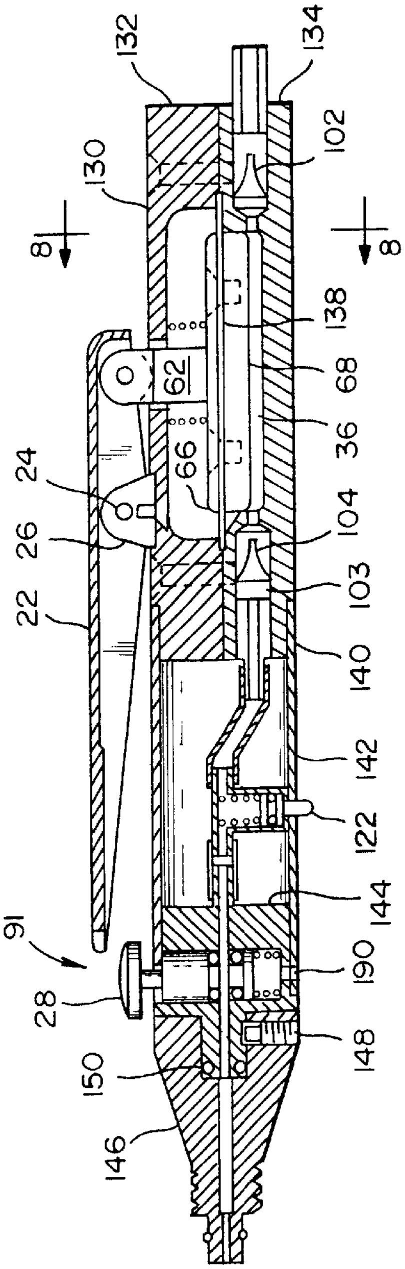
FIG. 7 is a longitudinal sectional view of an example of the invention.
Figure 8:
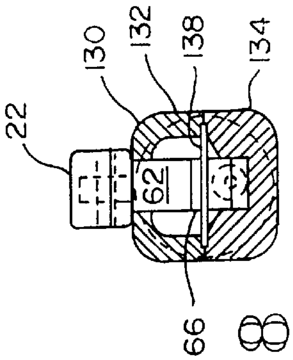
FIG. 8 is a cross sectional view of the structure of FIG. 7 taken along the reference lines 8—8 thereof.

In FIGS. 6, 7, and 8 an example of the invention is illustrated having all the basic structural and functional features of the implements depicted in the earlier figures. In this example, however, some different approaches in construction are presented. The tool body 130 in its rear portion consists of shorter upper and lower halves 132, 134 which are mutually relieved to form a vacuum chamber 136 within which is sandwiched the diaphragm sheet 138 and assembly as in the previous figures. The forward end of the cylindrical body 130 is provided with a reduced diameter portion 140 to receive and retain the rear end of a hollow cylindrical body portion 142, the forward end of which similarly receives and retains the valve bushing 144 which, in this example, is shown affixed and sealed to a forward nozzle portion 146 by, respectively, a set screw 148 and o-ring 150. In all other respects the structural details may be assumed to be like those of FIGS. 1 through 5; and, for clarity, like reference numerals are applied to similar parts in the different figures.

Figure 9:
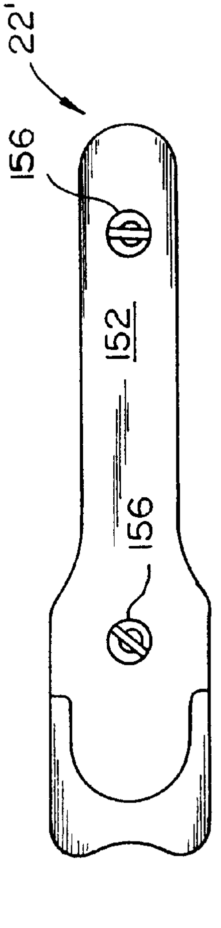
FIGS. 9, 10 and 11 are elevational views of an alternative example of a portion of the structure of FIG. 1.
Figure 10:
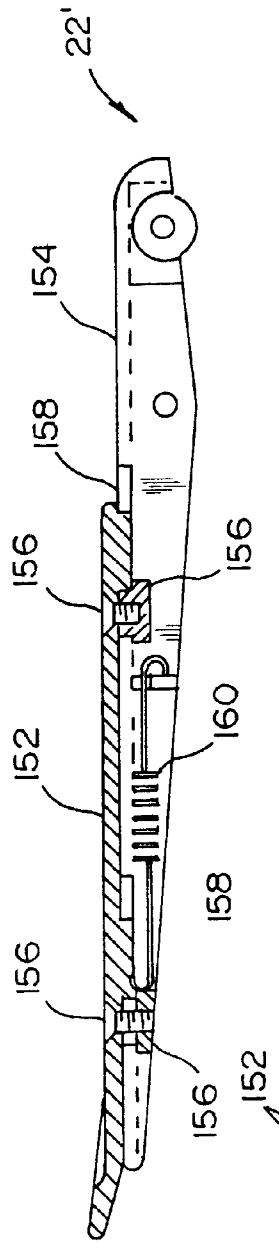
Figure 11:
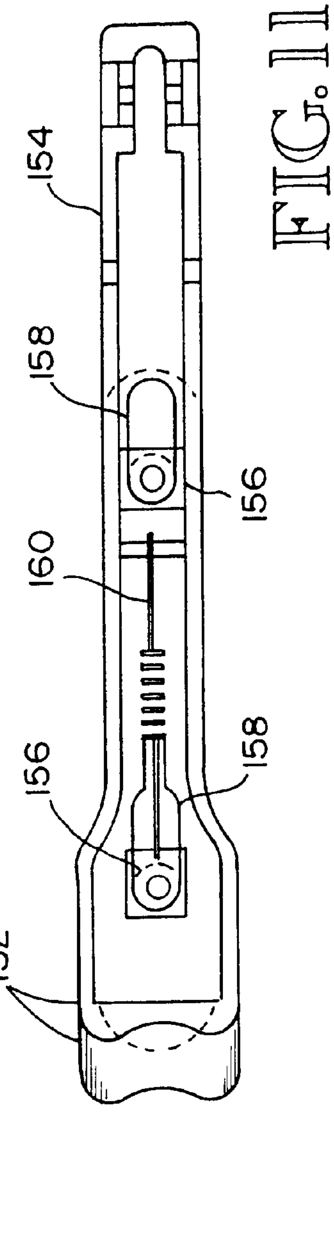

In FIGS. 9, 10, and 11 an example of the lever 22' is illustrated in which the forward end of the lever is a slidable portion 152 which may be pushed forwardly by the thumb of the operator to engage and actuate the valve trigger button 28 so as to more readily extinguish the holding vacuum and release the part being held at the suction cup. To this end, the slidable extension 152 is attached to the base portion 154 of the lever 22' by screws and nuts 156 which slidingly retain the extension in a pair of slots 158. A tension spring 160 is suspended between the parts to return the extension to its rearward, shortest disposition.

Referring to FIG. 12, details of structure of the wand assembly indicated in FIGS. 2 and 3 are shown. The base, rearward end of the wand 32 is formed with an enlarged diameter retaining shoulder 162 and a tapered interior shaped to fit snuggly over the tapered extension nib 59 of the fitting 58 (FIG. 4). The retaining nut 34 is of the character to engage the shoulder 162 and thread onto the threaded portion of the fitting 58. A set screw 164 may be provided to secure the wand 32 and resist torsional forces applied when the suction seep is holding a larger or unbalanced workpiece. Further details of the wand and suction cup assemblies are as described in connection with the description of FIG. 1. Again, like reference numerals in the various figures indicate at least essentially identical parts.

The structure illustrated in FIG. 13 may be assumed to be identical to that of the previous figures except that the wand 32' is formed with a bend as shown and is affixed to the suction cup holder 30' in a central, concentric manner as shown.

In FIG. 14 an example of the wand attachment is shown in which no locking nut is utilized and the tapered interior of the wand base is simply tightly pushed onto the tapered nib 59 and retained by its snug fit, such attachment being suitable when the holding of only very small workpieces is contemplated. To remove the wand from the tool body in such a configuration, it is desirable in some instances to provide a jacking nut 166 having a reduced diameter engaging shoulder 168 and which is threaded onto the fitting 58 ahead of the wand. Then when the wand is to be removed, the jacking nut is unthreaded forcing the detachment of the base of the wand from its tapered fit over the nib 59.

Figure 15:
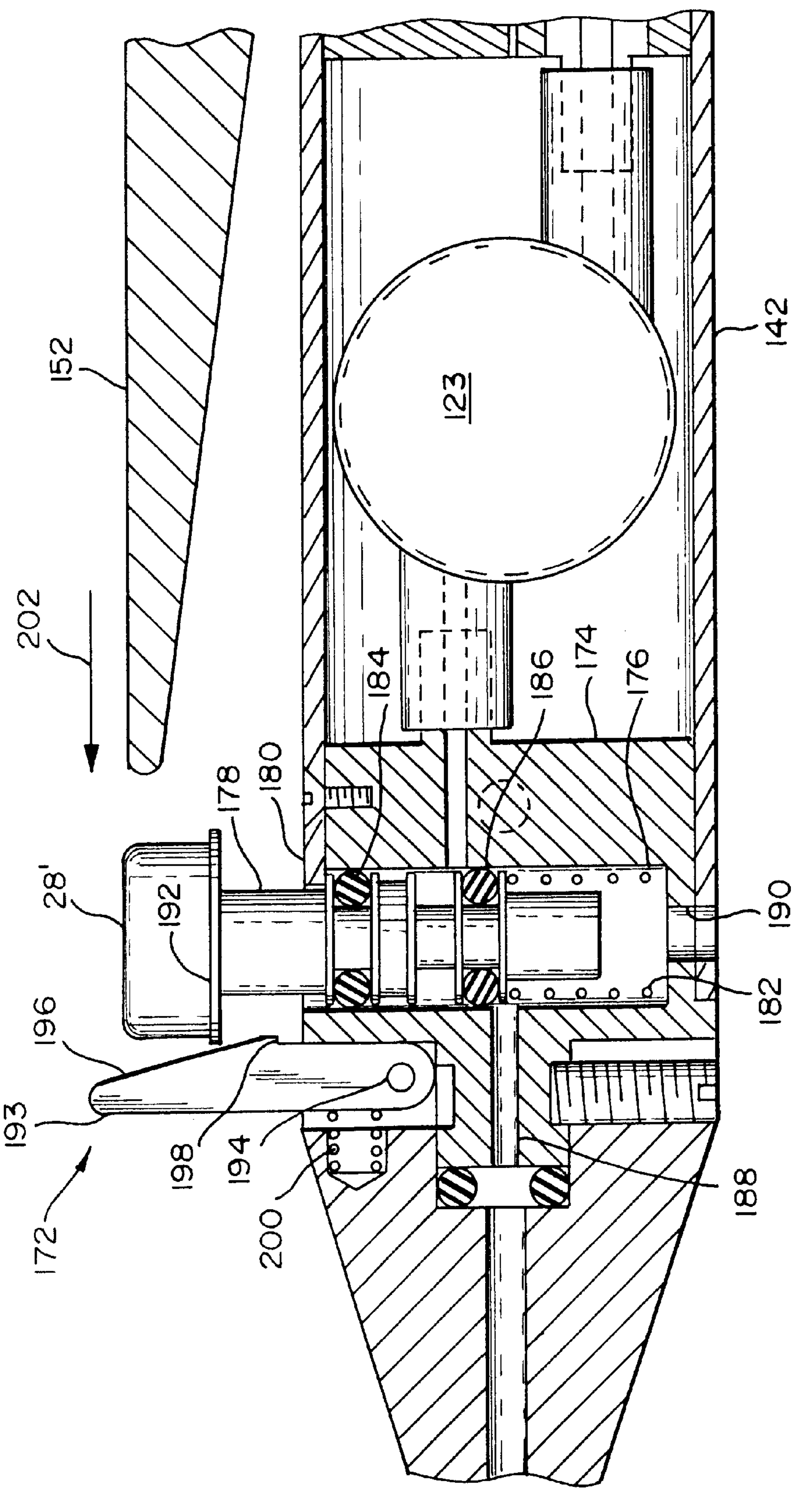
FIG. 15 is a sectional view of an alternative example of the trigger release valve of the tool of the invention.

In FIG. 15, an example of the invention is shown which includes the basic features of the examples of some of the previous figures; for example, a vacuum storage plenum 123 (FIG. 5), a forward body cylindrical portion 142 (FIG. 7), and a slidable lever extension 152 (FIG. 10) are indicated and may be assumed to be as described earlier. The valve assembly 172 is different in that it is normally closed to permit the storage of a relatively large magnitude of vacuum in the plenum 123 and its associated tubes and the vacuum chamber at the pumping diaphragm. Then when pickup action is desired, the valve is opened to the suction cup and a workpiece may be held until the valve is released or permitted to close off the vacuum and connect the suction cup to the ambient atmosphere. Accordingly, for as long as holding action is desired, the valve must be retained or locked in its non-normal (downward), open position.

Referring then to the details of the lockable valve assembly 172 , it includes a valve bushing body 174 having a valve cylinder bore 176 formed therein. A valve body 178 is retained therein by a lip 180 on the body 142 and a compression spring 182. The valve body 178 is loosely fitted in its cylinder bore to permit air flow past its spool portions except between a pair of retained O-rings 184 , 186. The valve is shown in its normally closed (upward) state so that the plenum chamber is sealed closed by the o-rings. On the other hand, the suction cup, through the duct 188 to the wand (not shown) is open by passage under the o-ring 186, past the lower portion of the valve body, and to the atmosphere through a relief port 190 in the bushing body 174 and body portion 142.

The top of the valve body 178 is terminated by a trigger button 28' which is formed with an enlarged diameter locking shoulder 192 about its base edge. A locking trigger 193 is pivotally mounted on the valve bushing body 174 by a pin 194 and extends upwardly with a sloping edge 196 that slidingly contacts the locking shoulder 192 of the button 28'. The sloping edge 196 is terminated at its bottom end by a locking notch 198 such that when the button 28' is depressed to open the valve, the locking shoulder 192 of the button is caught and held down by the locking notch 198 which is urged into such contact by a compression spring 200 retained in the bushing body and disposed against the locking trigger 193 above the pivot pin 194.

Thus, in a typical operation, the plenum 123 is evacuated by multiple strokes of the lever 152 with the valve assembly in its normally closed (upward) position. Then when holding action is required, the suction cup (open to the atmosphere through the port 190) is placed against the workpiece and the button 28' depressed where it is locked (down) by the trigger 193. This closes the leakage path through the port 190 and opens the vacuum storage plenum 123 to the suction cup creating the desired holding of the workpiece until the slidable extension 152 is pushed forward, as indicated by the arrow 202, by the thumb of the operator to move the trigger 193 away from its locking disposition with respect to the valve body 178 allowing it to snap upwardly and open the suction cup to the atmosphere through the leakage port 190.

Figure 16:
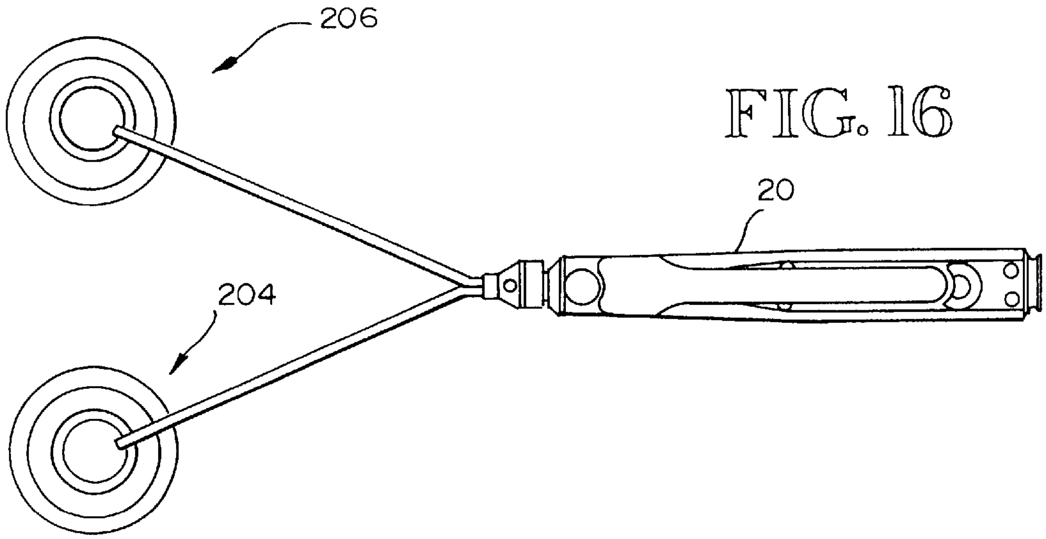
FIGS. 16 and 17 are plan views of alternative and additional embodiments of the tool basically illustrated in FIG. 1.
Figure 17:
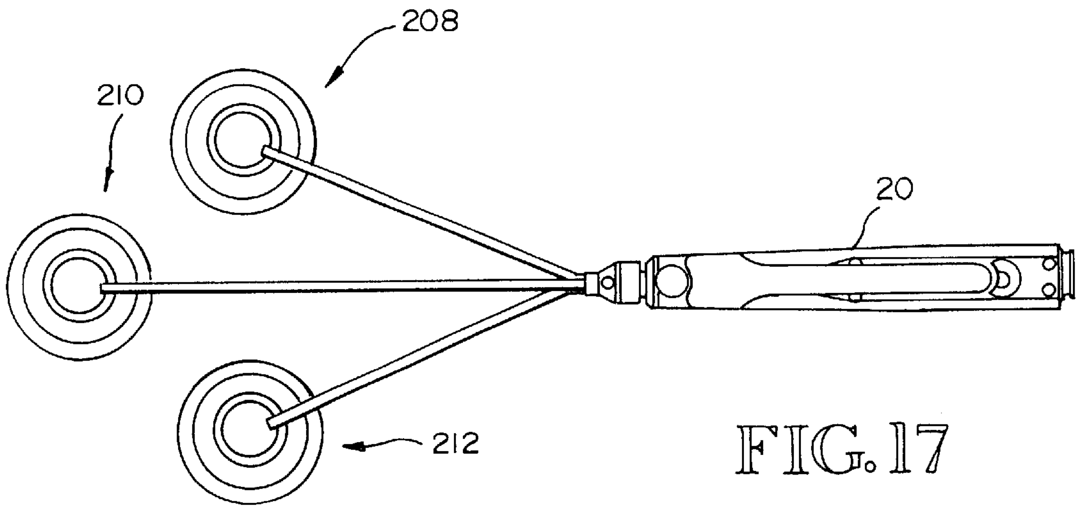

In FIGS. 16 and 17, examples of the invention are illustrated wherein multiple suction cup assemblies 204, 206 and 208, 210, 212, respectively, are provided for operations where larger workpieces are to be handled. The structure of these examples is like that of the previous examples except for the indicated double and triple reiteration of the suction cup assemblies.

In operation, other than as discussed above, it is to be noted that even with a small body—approximately five inches in length—the unidirectional valving permits repetitive or multicyle pumping of the diaphragm 70 and the easy maintenance of any desired vacuum levels of up to 20–25 inches of mercury. Accordingly, indefinitely long holding action is available when desired in tight work spaces.

What is claimed is:

1. A hand held, finger actuated multicyle vacuum pump pickup tool comprising:

A. A housing body having a rear end and a forward nozzle end and formed to include 1) a vacuum chamber internally thereof, 2) an exhaust port coupling said vacuum chamber to the atmosphere, and 3) a holding fixture fitting disposed contiguously to said nozzle end;

B. A diaphragm means disposed within said vacuum chamber and dividing it into first and second chamber portions, said first chamber portion being pneumatically coupled to said fixture fitting and separately to said exhaust port, said second chamber portion being pneumatically open to the atmosphere;

C. Finger operated lever means carried externally by said body and being connected to said diaphragm means to displace it to cause a volume expansion of said first chamber portion tending thereby to produce a reduced pressure or vacuum therein;

D. A first unidirectional air valve connected between said nozzle end fixture fitting and said first chamber portion and being of the character to permit air flow in that rearward direction only;

E. A second unidirectional air valve connected between said first chamber portion and said exhaust port to permit air flow in that rearward direction only; and F. Finger actuated holding valve means carried by said body contiguously to its said nozzle end and being pneumatically connected between said nozzle end fixture fitting and said first unidirectional air valve to selectively couple said nozzle end fixture fitting to said first chamber portion.

* * * * *